United States Patent [19]
Campbell et al.

[11] Patent Number: 5,766,401
[45] Date of Patent: Jun. 16, 1998

[54] PROCESS FOR THE MANUFACTURE OF PRESSURE SENSITIVE ADHESIVE LABELS IMPRINTED ON BOTH SIDES AND THE ASSEMBLED PRODUCTS

[75] Inventors: Michael Edward Campbell, De Pere; Daniel James Hirst, Mequon, both of Wis.

[73] Assignee: Belmark, Inc., De Pere, Wis.

[21] Appl. No.: 372,845

[22] Filed: Jan. 13, 1995

Related U.S. Application Data

[63] Continuation of Ser. No. 959,625, Oct. 13, 1992, abandoned.

[51] Int. Cl.$^6$ ........................................ B32B 31/00
[52] U.S. Cl. .................. 156/277; 156/275.5; 156/275.7; 156/252; 156/278; 428/345; 428/447
[58] Field of Search ........................... 156/277, 324, 156/289, 184, 185, 187, 332, 252, 264, 275.5, 275.7, 278, 71; 40/638, 594, 595; 428/345, 352, 354, 355, 40.1, 42.1, 43, 447, 906

[56] References Cited

U.S. PATENT DOCUMENTS

| | | |
|---|---|---|
| 3,268,357 | 8/1966 | Hart . |
| 4,068,028 | 1/1978 | Samonides ........................ 428/40 |
| 4,251,302 | 2/1981 | Leonard et al. ................... 156/334 |
| 4,253,899 | 3/1981 | Takemoto et al. ................. 156/277 |
| 4,562,102 | 12/1985 | Rabuse et al. .................... 156/90 |
| 4,959,115 | 9/1990 | Lacy ................................ 156/289 |
| 4,960,482 | 10/1990 | Crane et al. ..................... 156/277 |
| 4,977,006 | 12/1990 | Smith et al. ..................... 428/42 |
| 4,978,415 | 12/1990 | Jones .............................. 156/256 |
| 4,994,299 | 2/1991 | Stein et al. ...................... 427/386 |
| 5,037,700 | 8/1991 | Davis .............................. 156/300 |
| 5,059,479 | 10/1991 | Yuyama et al. .................. 428/323 |
| 5,084,354 | 1/1992 | Krankkala et al. ............... 428/447 |
| 5,154,962 | 10/1992 | Mertens et al. ................. 428/906 |

OTHER PUBLICATIONS

Valley Adhesives & Coating Corp., Adhesive A-3172-F Technical & Material Safety Data Sheets, 1992.

*Primary Examiner*—James Engel
*Attorney, Agent, or Firm*—Paul Y. Feng; John C. Brezina; Brezina & Ehrlich

[57] ABSTRACT

The invention provides a process for making an assembly of self-adhering, pressure sensitive labels wherein a facestock of continuous printable sheet material is first printed and overcoated with a silicone polymer acting as a release agent on its obverse side and is next printed and overcoated with a waterborne, pressure sensitive polymer adhesive on its reverse side, the imprinted and coated sheet material then being assembled into a coiled sheet roll or into a layered stack of selected lengths thereof, such that the first (obverse) side of one length of sheet material is placed in substantially contiguous contact with the opposing second (reverse) side of each subsequently assembled length of sheet material. The resulting label package does not require additional silicone release sheets, and the continuous sheet can be perforated and/or cut during assembly to provide a packaged supply of tear-off labels. The labels are particularly useful for commercial use on glass windows, door panels or the like, which are often exposed to severe weathering conditions and which require labels to be visible from both sides and to remain capable of being easily peeled off and removed.

2 Claims, 3 Drawing Sheets

PROCESS FLOW CHART

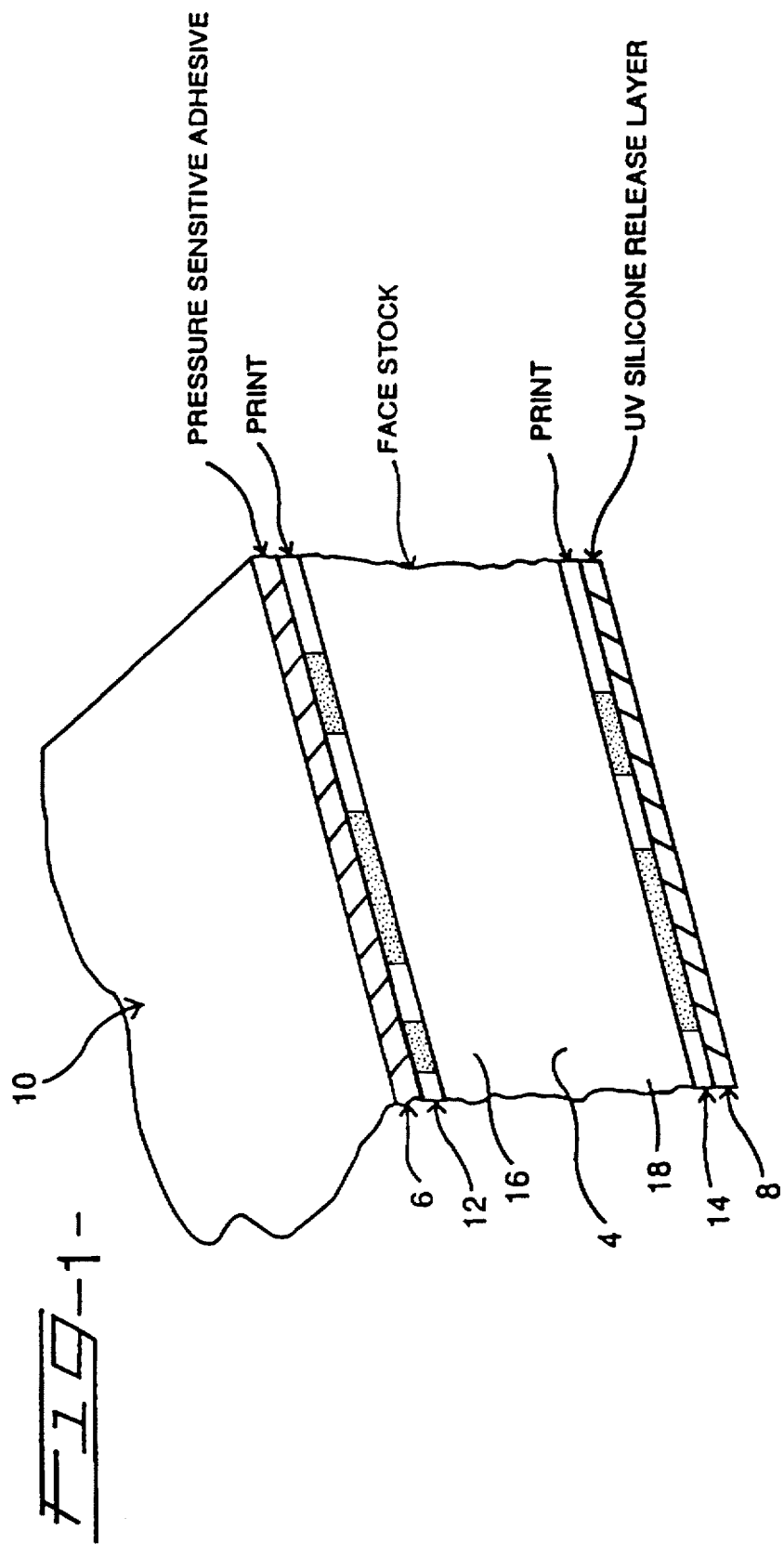

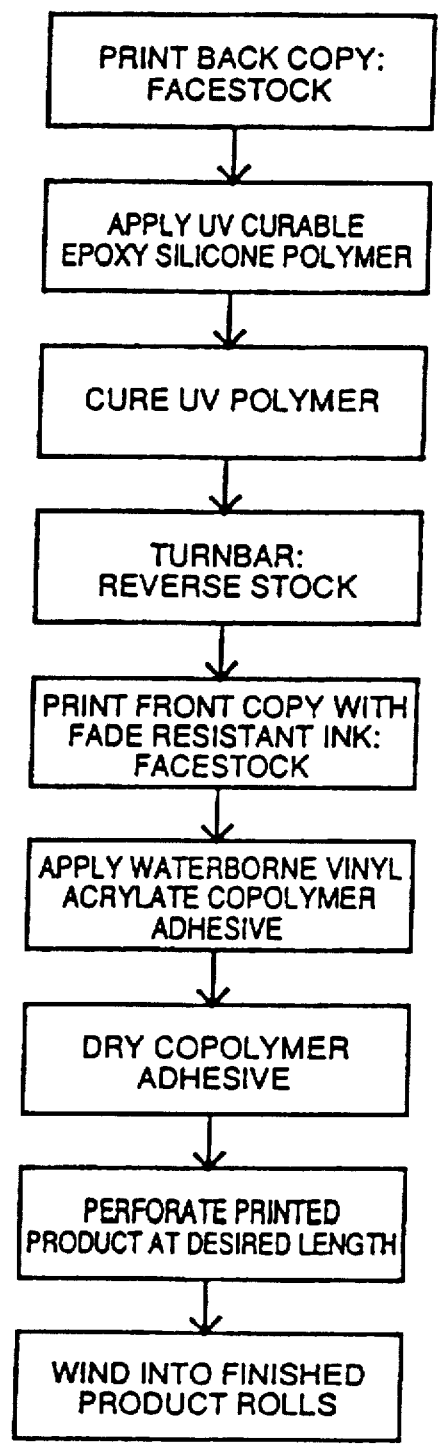
FIG-2-
PROCESS FLOW CHART

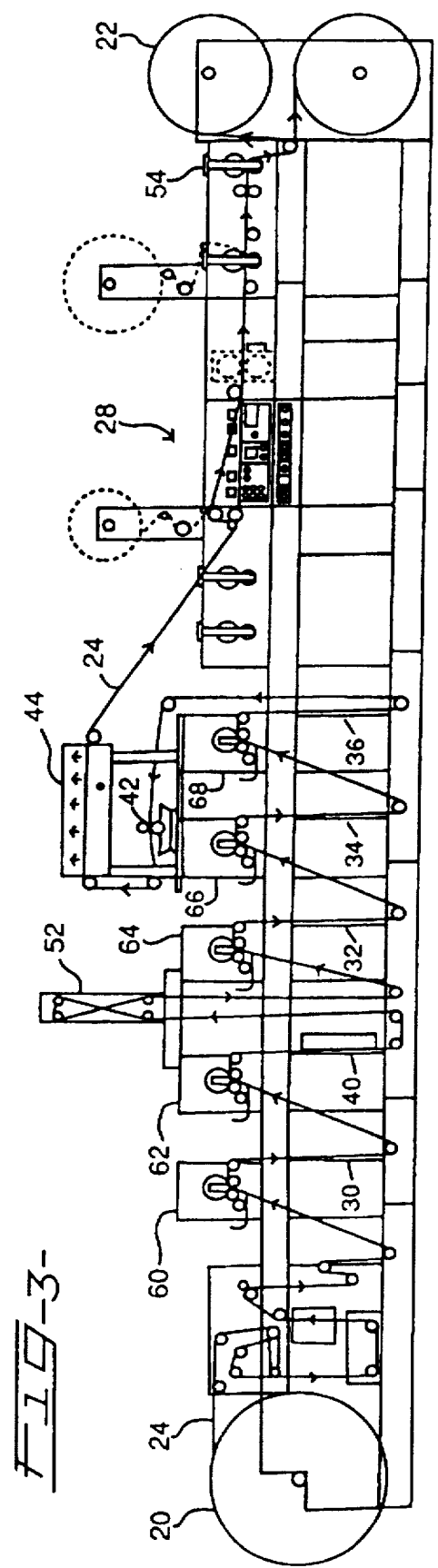

5,766,401

PROCESS FOR THE MANUFACTURE OF PRESSURE SENSITIVE ADHESIVE LABELS IMPRINTED ON BOTH SIDES AND THE ASSEMBLED PRODUCTS

This is a continuation of application Ser. No. 07/959,625 filed on Oct. 13, 1992, now abandoned.

FIELD OF THE INVENTION

The invention relates to the manufacture of pressure sensitive adhesive labels imprinted on both sides, and more particularly, the method used for the manufacture of such labels in assembled or packaged form for individual removal and application to residential and commercial windows, door panels and the like.

BACKGROUND OF THE INVENTION

Manufacturers of products containing glass or other transparent materials, for example, window and door assemblies, often desire to affix the manufacturer's logo to the product with both sides of the mounted label visible when placed on a transparent surface. It is also desirable that the label contain a duplicate logo, window installation instructions, label removal instructions or some combination of these on its reverse side.

Known labels have met these requirements in several ways. One way is to print both sides of the label and manually apply adhesive over the ink on one side of the label at end use. This method is costly because it is time consuming during the window or door manufacturing process, and the amount of adhesive application is difficult to control.

The patent to Samonides, U.S. Pat. No. 4,068,028, shows a process for printing labels on both sides, which is accomplished by using printing rollers and a turnbar assembly. After printing a continuous sheet or strip of labels, they are affixed to a removable release sheet at the output end of the machine, followed by die cutting of the labels and removal of the waste label stock from the backing release sheet.

Another prior art method has been to apply adhesive in the form of a double-sided transfer tape to the periphery of the printed label and away from the printed material. This approach has the disadvantage that the label tends to bubble or wrinkle in the non-adhesive area when moist or wet, detracting from the overall aesthetics of the product to which the label is attached.

An alternative solution to the wrinkling problem is to use standard removable pressure sensitive label stock and print on the adhesive layer. This has two disadvantages. First, the print quality when printing o n the adhesive can be negatively affected by movement of the adhesive, particularly under hot conditions. Second, an ink intensive logo may cover too much of the adhesive and cause unsuitable adhering qualities of the label.

Another prior art solution is the use of a water soluble adhesive over one side of the printed label. This label is supplied to window and door manufacturer s on a silicone coated carrier liner. While of high print quality, it has the disadvantage of causing the window or door manufacturer to find a way to dispose of the silicone carrier liner material.

Compounding the problems described above is the need of the end user to easily remove the label from the transparent surfaces. Adhesives used in the prior art, particularly those used with transfer tape, tend to stick tightly to the transparent surfaces causing difficult label removal conditions. In some cases, end users are required to use razor blades and scrapers in combination with solvents to remove the label. The risk of damaging or scratching the transparent surface or the peripheral areas is high. Even with more easily removable water soluble adhesives, washing and scraping equipment is required in addition to waiting about a minute for water to soak into the paper label.

It is therefore an object of the present invention to provide an apparatus and method for manufacturing a label product that has high quality print on both sides, has the feature of pressure sensitive application, can be removed simply by peeling the label from the transparent surface without leaving a residue, and does not require a separate silicone coated carrier liner.

SUMMARY OF THE INVENTION

The process of the invention requires a printing press that applies ink from printing rolls to both sides of a continuous printable sheet of stock. Suitable printing machines are readily available, and it is preferable to use flexographic printing equipment into which a continuous sheet or band of stock material, printable on both sides, can be continuously fed at relatively high speeds to pass through one or more sets of print rollers in order to print and then coat first on one side (the face or obverse side) and subsequently on the other side (the reverse side) of the stock. The individual labels are preferably printed sequentially along the length of the sheet stock to extend entirely across the width of the sheet. This permits each label to be later separated and removed by cutting and/or perforating along the transverse edges thereof. This process produces a multilabel product containing the individual labels in the form of a coiled roll or a flat stack of individual sheets of one or more labels in a compact bundle or pad.

The process of the invention is advantageously carried out by the following steps:

a) printing indicia on one side of e facestock by feeding it continuously through said printing rolls;

b) applying an ultraviolet curable epoxy silicone polymer onto the first printed side of said facestock;

c) curing said polymer on the facestock by exposing it to ultraviolet radiation;

d) conducting the feed stock continuous sheet material thus treated through a turnbar assembly to expose the second side of said facestock for printing;

e) printing indicia on said second side of said feed stock as in the first printing step;

f) applying a waterborne polymer having pressure sensitive and easy release adhesive properties to said second side of said facestock;

g) drying the polymer adhesive to form a pressure sensitive adhesive coating on said second side of the continuous material; and h) assembling said continuous material thus obtained into a coiled sheet roll or into a layered stack of selected lengths thereof separated such that said first side of one length of sheet material is placed in substantially contiguous contact with an opposing second side of each subsequently assembled length of sheet material.

In order to obtain a roll of labels, the continuously imprinted and coated sheet material is perforated transversely across said sheet along the edges of each individual label, and the continuous perforated sheet is coiled into a roll of tear-off labels.

A bundle or pad of labels can be obtained if the continuously imprinted and coated sheet material is cut transversely across said sheet at selected lengths thereof to form individual sheets of one or more labels, and a plurality of said individual sheets are flatly stacked into a bundle or pad. Preferably, the continuously imprinted and coated sheet material is first perforated transversely along the edges of individually selected labels and cut transversely to form individual sheets of two or more labels, and the cut sheets are then assembled and stacked to form a pad of tear-off labels.

In coating the first side of the sheet, it is possible to use any silicone coating material commonly used in forming silicone release sheets provided that it becomes firmly attached to the underlying imprinted stock and will meet certain minimum requirements of resistance to weathering. It has been found in the development of the present invention that excellent results are achieved with ultraviolet curable epoxy silicone polymers as shown by the weathering tests discussed below. Equivalent curable silicones can be used to the same advantage. By using an ultraviolet curable silicone polymer or resin, the curing step can be carried out very rapidly so that the polymer is completely cured as the sheet material runs continuously at high speed into the second printing and coating steps.

The waterborne polymer adhesive used in the second step is preferably a vinyl acrylate copolymer which is rapidly heat curable at elevated temperatures to form a pressure sensitive adhesive layer or coating which not only releases easily from the silicone release coating on the obverse side of the labels, but also permits the label itself to be relatively easily peeled away from a glass window or similar glossy, transparent surface onto which the label has been applied, even after extreme weathering. Of course, one should select waterborne polymer adhesives with a relatively low content of water so that they can be quickly dried during the continuous printing and coating process.

In addition, both the curable silicone release polymer and the waterborne pressure sensitive adhesive polymer should be as clear and transparent as possible after being applied and set onto the two opposing sides of the sheet stock. Such results can be easily determined by routine testing of potentially suitable polymers of both types.

The features and advantages of the invention will be further understood upon consideration of the following embodiments taken in conjunction with the drawings, in which:

BRIEF DESCRIPTION OF THE DRAWINGS

FIG. 1 is a cross-sectional view of the label produced by the invention shown in FIG. 3;

FIG. 2 is a process flow chart of the preferred method of manufacturing the label of FIG. 1; and FIG. 3 is an illustration of a preferred embodiment of an apparatus for manufacturing the label of FIG. 1 according to the method shown in FIG. 2.

DETAILED DESCRIPTION OF THE PREFERRED EMBODIMENTS

FIG. 1 depicts a label 10 which consists of a sheet of standard coated 2-side facestock 4 having reverse and obverse (face) surfaces 16, 18, respectively. The face or obverse surface 18 is that which faces outwardly when the label is adhered to an underlying surface by the adhesive layer 6.

Overlying surfaces 16, 18 are layers of ink 12, 14 in the form of printed matter. Overlying the printing on the reverse surface 16 is a layer of waterborne pressure sensitive adhesive 6.

Overlying the printing on the reverse surface 18 is a layer of the UV cured silicone release coat 8. The release coat 8 permits the finished labels 10 to be wound into rolls 22 and not adhere to each other. Dispensing from rolls 22 or from cut and assembled sheets or pads of labels by the window or door manufacturer is thereby enhanced.

The method of printing the obverse and reverse layers 16, 18 is known. The pattern formed by ink layers 12, 14 may have the same spatial boundaries as the sheet of stock 4; however, that is not required. For example, if the label stock is the same color as part of a manufacturer logo, there is no need to print that color on the label. In contrast, the adhesive layer 6 and the silicone release layer 8 are coextensive with the label stock 4 assuring full adhesion to the transparent surface as well as full release when finished product rolls 22 are rewound into rolls for shipment to customers and the labels 10 are subsequently dispensed.

The facestock 4 is what is known in the art as standard coated two-side 60 pound facestock. Other facestocks are acceptable as long as they are coated two sides. The inks used to print the obverse and reverse 16, 18 sides of the facestock 4 are preferably PH neutral inks which are fade resistant for a period of 6 months when the label 10 is exposed to sunlight or ultraviolet light. The PH neutral inks will not react chemically with the UV silicone release layer or prevent a firm and complete attachment of this release layer to the facestock.

In furtherance of two of the goals of this invention, i.e., good adhesion under extreme weather conditions and easy removal from a transparent surface by peeling off the label 10 without leaving residue, the adhesive should have a good wetting ability and a viscoelastic behavior leading to good peel adhesion and resistance to shear. On the other hand, the adhesive must also bind only weakly to a release agent so that the final product can be separated conveniently at the time of application. In the presently preferred embodiments, we found that such characteristics can be achieved by using a combination of an epoxy silicone polymer as the release agent, and an adhesive consisting essentially of approximately (within a 2 to 8% range) 34 wt-% of poly(2-ethylhexyl acrylate), 4 wt-% of poly(methyl acrylate), and 62 wt-% of poly(butyl acrylate) is manufactured by Valley Adhesive and Coatings Corp. and is identified by such as Product Code #A-3172-F which is available commercially from the Valley Adhesive and Coating Corporation, Appleton, Wis. A mixture of this type was found to give a product which is superior to all other compositions tested in our laboratory.

In furtherance of an additional goal of the invention, a silicone release coating 8 is applied on the opposite side of the adhesive coating 6 to facilitate winding of the finished labels 10 into rolls or stacking as individual cut sheets without use of a separate paper silicone release liner or backing. The UV cured silicone release layer 8 is preferably that produced by G. E. Silicones. This material is a combination of 97 parts by weight of UV polymer (solventless UV curable epoxy silicone polymer-Code #UV-9315) and 3 parts by weight of UV catalyst (photoactive iodonium salt solution-Code #UV-9310-C).

In practice, the finished label 10 is applied to a transparent surface such as glass in a window or door assembly by pressing it in place. Removal of the label 10 is accomplished by simply peeling the construction off the transparent surface. No further cleanup is necessary.

FIG. 2 sets forth the preferred set of process steps for manufacturing the labels 10 in FIG. 1 for assembly into a tightly wound coil or roll. FIG. 3 depicts the presently preferred embodiment of the printing press 28 to accomplish the process steps in FIG. 2. The printing press 28 is a Mark Andy Model 4120 flexographic printing press modified as set forth below.

As shown in FIG. 3, a web of label stock 24 is continuously fed into the press 28 from supply roll 20. Print station 60 applies installation or label removal instructions to the obverse or face side 18 of the label stock 24. The instructions are printed by standard flexographic printing techniques utilizing anilox rolls which form no part of the invention. If a duplicate logo is desired, additional print stations may be required as described below. The printing ink is dried at station 30 by an impinging hot air dryer supplied by the press manufacturer at a nominal temperature of 175° Fahrenheit.

In print station 62, the layer of UV silicone release polymer 8 is applied on top of the printed instructions 14. Application includes use of a 550 line anilox roll which yields a 1.25#/ream+/−10% coat layer. A UV dryer 40 cures the UV silicone release polymer layer 8. The UV curing unit is a standard 2-bulb, 300 watts/inch unit supplied by AAA Press Specialists Inc., Palatine, Ill. Press speeds up to 300 fpm can be readily accommodated by this unit.

After the UV curing unit 40, the continuous web is fed into a turnbar 52 which flips the web 24 over for printing on the reverse side 16 of the stock. Subsequent print stations 64, 66, 68 apply various color inks to the label stock 4 in a preselected pattern. After each print station, the ink is dried by a hot air dryer 32, 34, 36 which is substantially the same as dryer 30. This is a standard method of drying the flexographic inks and forms no part of the invention. The press in FIG. 3 is able to print one color on the reverse side 18 of the facestock 4 and three colors on the obverse side 16. Additional colors require additional print stations.

After exiting the last ink dryer 36, the web 24 is diverted upward into an adhesive coater 42. In the present preferred embodiment, a gravure roll applies the adhesive layer 6 to the facestock 4 on top of the print 12 on the reverse side 16 of the web 24. The gravure roll, with a volume of 27 CB microns and a wiping system controls the amount of adhesive to approximately 9.5#/ream. The coater system 42 in the presently preferred embodiment was designed and constructed by Viking Machinery Co., De Pere, Wis. The design of the coater system 42 is known and is identical to the dryers commercially available to the coating industry except for its narrower width (10") to match the press 28.

After the adhesive is applied, the web 24 moves into a continuous dryer 44 which operates at much higher temperatures than the ink dryers on the press 28. They dryer 44 is designed to fit on top of the gravure roll coater 42. This dryer 44 operates at temperatures approximating 1550° Fahrenheit which, with a hot air exhaust system, is sufficient to dry the waterborne pressure sensitive adhesive layer 6 at press speeds of approximately 200 fpm. The dryer system 44 in the presently preferred embodiment is known and is manufactured by the Moffit Co., Chicago, Ill.

The web 24 exits the dryer 44 and is moved through several rollers in the press to a die station 54. At this point, the web 24 is perforated across its width resulting in tear off sheets of a predetermined length. The perforated web 24 is then wound into finished product rolls 22.

The labels of this invention are primarily used on household window and storm door units, commonly sold to the contracting trade for use in new construction or remodeling of homes. The unique nature of applicant's label is Illustrated by the testing procedures which reflect the practical environment in which the label is used. Test panels are subjected to weatherometer exposure (ASTMG53) for hundreds of hours. The cycle of this artificial "weathering" test consists of hours of UV exposure at relatively high temperatures (e.g., 70° C.), followed by hours of exposure to condensation at a somewhat lower temperature. Other tests included exposing the label affixed to a window panel for weeks, in alternating 24 hour periods, to cold (e.g., minus 20° F. at 50% humidity), then to hot temperatures with the same humidity, followed by exposure to room temperature. Similar tests were conducted at varying temperatures and humidity.

These demanding tests, which distinguish applicant's process and labels from the prior art labels and ordinary labels, result from the fact that the window panels are subject to extremely varying atmospheric conditions from the time they leave the window or door manufacturer. They may be stored in a lumber retailer's warehouse in winter or summer, at varying temperature extremes and, of course, varying humidities. Applicant's labels meet these demanding requirements of staying in place until the glass unit is installed, at which time the same label which has had to endure the demanding tests of adherence under the above conditions, has to be easily removable by the home owner without tedious use of razor blades and the like.

Applicant's labels made by the process described herein meet the tests of usage, and an additional series of economically and technically desirable attributes. The printing equipment for making these labels is of the flexographic type, utilizing rolls for printing and guiding through the machine. The process of this invention enables roll stock to be put into the input end, a label printed on both sides, the adhesive applied in accordance with applicant's process. It is economically advantageous to be able to sell the printed label stock in roll form without the customary release backing sheet and with the rolls being shipped to the label converter's customers in roll form. Of course, the same technical problems as outlined above as to weathering and releasability apply to the period when the labels are in roll form leaving the printer/converter and being shipped to and used by a customer, e.g., a window manufacturer. The adhesive-backed labels have to be applied by the window manufacturer and, to do that, they have to be capable of being separated readily. It is highly desirous of having labels in roll form which are readily separable without the use of an intervening release sheet. While the environmental conditions do not vary as greatly as outlined above for the labels applied to the finished product, such as a window, the conditions during shipping, storage and use in the customer's plant vary significantly, and any significant variance in the action of the adhesive would be a disadvantage.

While the invention has been described in detail with reference to particular embodiments, those of skill in the art will recognize modification in material and arrangement which will nevertheless fall within the scope of the invention.

The invention is hereby claimed as follows:

1. An improved process for making self-adhering, pressure sensitive labels imprinted on both sides of a facestock consisting of a continuous printable sheet material by use of continuously-fed printing rolls, printing continuously indicia on one side of the facestock, applying and curing an ultraviolet curable polymer onto the first printed side of said stock, exposing the second side of the sheet material through a turnbar assembly and printing said second side; and arranging said printed material into a coiled roll or into a layered stack of selected lengths thereof separated such that said first side of one length of sheet material is placed in substantially contiguous contact with an opposing second side of each subsequently assembled length of sheet material; the improvement comprising applying a waterborne co-polymer composition after the printing of said second side and heating, said waterborne polymer composition consisting essentially of an aqueous emulsion of approximately 34 Wt-% of poly(2-ethylhexyl acrylate), 4 wt-% of poly(methyl acrylate), and 62 wt-% of poly(butyl acrylate).

2. The product obtained by the process of claim 1.

* * * * *